(12) United States Patent
Ciano et al.

(10) Patent No.: US 8,726,275 B2
(45) Date of Patent: May 13, 2014

(54) SELECTIVE PARTIAL CLONING OF VIRTUAL MACHINES IN A VIRTUAL COMPUTING ENVIRONMENT

(75) Inventors: Giuseppe Ciano, Rome (IT); Louisa Lentile, Rome (IT)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/968,524

(22) Filed: Dec. 15, 2010

(65) Prior Publication Data

US 2011/0154331 A1    Jun. 23, 2011

(30) Foreign Application Priority Data

Dec. 18, 2009    (EP) ..................................... 09179912

(51) Int. Cl.
*G06F 9/455*    (2006.01)
(52) U.S. Cl.
USPC ................................................................ 718/1
(58) Field of Classification Search
None
See application file for complete search history.

(56) References Cited

U.S. PATENT DOCUMENTS

| | | | |
|---|---|---|---|
| 7,313,793 B2 * | 12/2007 | Traut et al. ........................ | 718/1 |
| 7,356,679 B1 | 4/2008 | Le et al. | |
| 7,370,164 B1 | 5/2008 | Nagarkar et al. | |
| 8,135,930 B1 * | 3/2012 | Mattox et al. ................. | 711/162 |
| 8,453,145 B1 * | 5/2013 | Naik .................................. | 718/1 |
| 2004/0221290 A1 | 11/2004 | Casey et al. | |
| 2007/0074208 A1 | 3/2007 | Ling et al. | |
| 2007/0244938 A1 | 10/2007 | Michael et al. | |
| 2007/0283314 A1 | 12/2007 | Browning et al. | |
| 2008/0134178 A1 | 6/2008 | Fitzgerald et al. | |
| 2008/0163210 A1 | 7/2008 | Bowman et al. | |
| 2008/0244028 A1 | 10/2008 | Le et al. | |
| 2008/0271017 A1 * | 10/2008 | Herington ......................... | 718/1 |
| 2009/0119665 A1 | 5/2009 | Venkitachalam et al. | |
| 2009/0313447 A1 * | 12/2009 | Nguyen et al. ................. | 711/162 |
| 2011/0093847 A1 * | 4/2011 | Shah ................................. | 718/1 |
| 2011/0145816 A1 * | 6/2011 | Glikson et al. ..................... | 718/1 |
| 2012/0005672 A1 * | 1/2012 | Cervantes et al. ................. | 718/1 |
| 2012/0072393 A1 * | 3/2012 | Kumar et al. ................. | 707/634 |

OTHER PUBLICATIONS

Open Virtualization Format Specification, Version 1.0.0 (Feb. 22, 2009).*

* cited by examiner

*Primary Examiner* — Abdullah Al Kawsar
*Assistant Examiner* — Benjamin Wu
(74) *Attorney, Agent, or Firm* — Thomas E. Lees, LLC (57) ABSTRACT

A virtual machine belonging to a virtual computer environment is selectively cloned by retrieving information about applications available in a parent virtual machine to be cloned, and for each application, further retrieving information about a virtual disk associated with the application. Cloning is further performed by identifying a target environment on which the clone is to run, retrieving information about the target environment and calculating a clone of the virtual machine based at least in part, upon retrieved information. Calculating a clone further includes introspecting the virtual disks of the virtual machine. Cloning a virtual machine further comprises generating the clone to the target environment, based on the calculated clone.

16 Claims, 5 Drawing Sheets

SELECTIVE PARTIAL CLONING OF VIRTUAL MACHINES IN A VIRTUAL COMPUTING ENVIRONMENT

CROSS-REFERENCE TO RELATED APPLICATIONS

This application claims priority to European Patent Application No. 09179912.2, filed Dec. 18, 2009, the disclosure of which is incorporated herein by reference.

BACKGROUND

Embodiments of the present invention relate generally to computer systems, and in particular to cloning a virtual machine in a virtual computer environment.

Virtual machine technology is becoming prevalent in distributed information technology (IT) markets and cloud computing industries. Virtualization is an abstraction layer that allows multiple virtual environments with heterogeneous operating systems to run in isolation, side-by-side on a same physical machine. Virtualization also enables decoupling underlying physical hardware from associated operating systems. Still further, virtualization enables hiding physical information and resources. Many efforts are currently underway to improve performance and simplify system management of virtual machines. One technology for virtual machine improvements is the process of "cloning" a virtual machine to create multiple further virtual machines based on the virtual machine that was cloned.

A clone designates a copy of an existing virtual machine. The existing virtual machine from which the clone is created is generally referred to as the clone parent. When the cloning operation is completed, the clone is a separate virtual machine, different from the parent virtual machine.

Cloning allows making a number of copies of a same virtual machine from a single installation and configuration process. This saves time in the virtual environment installation process which requires creating the virtual machines and installing a guest operating system and guest applications for each virtual machine. Cloning is particularly useful when there is a need to deploy many identical virtual machines to a group. For example, a company department can generate a clone instance of a virtual machine for each employee within the department, such that each virtual machine includes a suite of preconfigured office applications. As another example, a teacher can clone a virtual machine to create a clone instance for each student, where each clone includes all the lessons and labs required for a school term. A virtual machine can be configured with a complete development environment and then be cloned repeatedly as a baseline configuration for software testing.

Conventional technologies for cloning a virtual machine comprise an initial phase of creating an image of a virtual machine by recording the contents of its file system(s) and/or memory address space. Then, a new virtual machine is started by making a copy of the recorded image. The parent virtual machine and its associated metadata are referred to as a template.

Such conventional cloning technologies generally provide a full clone of a virtual machine. The only modifications that can be made to the virtual machine template are activation changes needed to configure a Virtual Machine with new hostname/Internet Protocol (IP) address for example. Activation changes do not change the Virtual Machine but allows it to work with different parameters like network settings or credentials. Such full clone does not allow optimization of the virtual machine resource allocation and the reuse of already existing software assets.

BRIEF SUMMARY

A virtual machine in a virtual computer environment is selectively cloned by retrieving information about applications available in a parent virtual machine to be cloned, and for each application, further retrieving information about a virtual disk associated with the application. Cloning is further performed by identifying a target environment on which the clone is to run, retrieving information about the target environment and calculating a clone of the virtual machine based at least in part, upon retrieved information. Calculating a clone further includes introspecting the virtual disks of the parent virtual machine to be cloned. Cloning a virtual machine still further comprises generating the clone to the target environment, based on the calculated clone.

BRIEF DESCRIPTION OF THE SEVERAL VIEWS OF THE DRAWINGS

Embodiments of the present invention will now be described by way of example with reference to the accompanying drawings in which like references denote similar elements, and in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION

Figure 1:
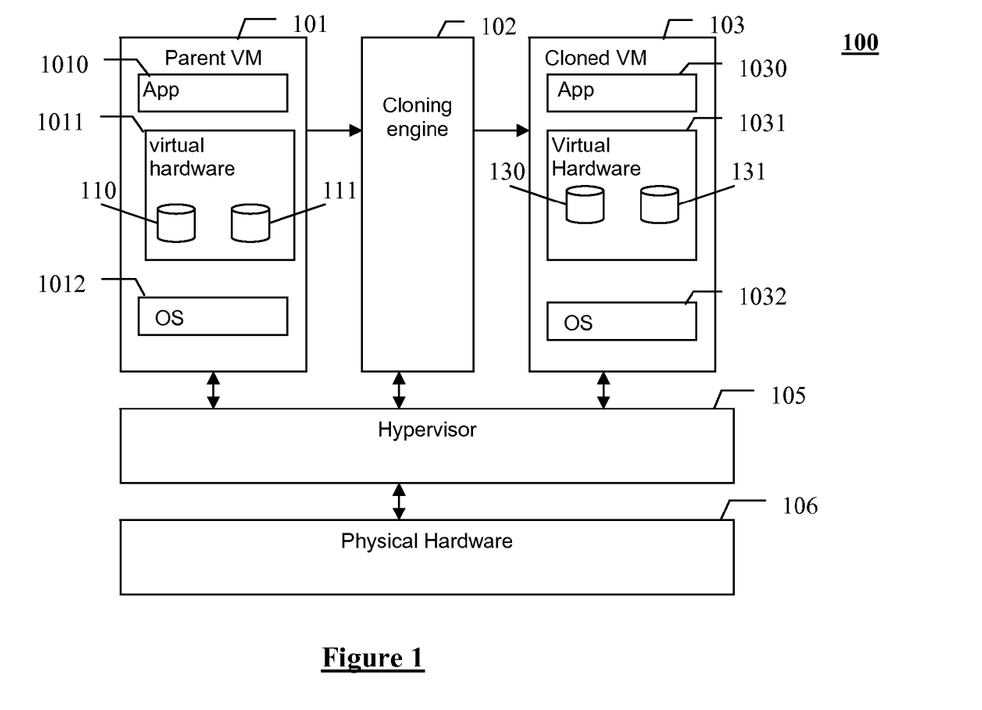
FIG. 1 is a block diagram showing a cloning system according to certain embodiments of the invention.

FIG. 1 shows a system 100 for selectively cloning virtual machines in a virtual computer environment, in accordance with certain embodiments of the invention. System 100 includes a cloning engine 102 for selectively cloning a parent virtual machine 101 into a cloned virtual machine 103.

A virtual machine is a software abstraction of a physical computer system that is installed as a "guest" on "host" hardware platform 106. The host hardware platform 106 may include one or more processor(s), memory, storage devices, and disk drives. The host hardware may also include one or more network connection devices for the transfer of data between the system and a network such as the Internet. The hardware platform 106 may exist within one or more distinct physical device or machines of system 100.

The parent virtual machine 101 includes a guest operating system 1012, guest applications 1010 running on the guest operating system 1012, and virtual hardware 1011 which represents a hardware state of the parent virtual machine. Virtual hardware 1011 refers to the hardware resources allocated to the parent virtual machine 101 and is mapped to hardware platform 106. The virtual hardware 1011 comprises one or more virtual disks 110. Virtual disks 110 are stored as files on the host computer or on a remote storage device, and appear to the guest operating systems as standard disk drives.

The virtual hardware 1011 further comprises at least one configuration file 111 that contains information about the operating system, disk types, disk sizes, networking and other system data. It may also contain additional tags that can be used for application specific purposes. The virtual hardware 1011 additionally comprises one or more virtual CPUs, a virtual system memory, and may further comprise various virtual devices for which the guest operating system 1012 includes corresponding drivers. All of the components of the virtual machine may be implemented in software using known techniques to emulate the corresponding physical system components.

Each application 1010 and the guest operating system 1012 behave as if they were running on their own real computer. Executable files are accessed by the guest operating system 1012 from the virtual disks or virtual memory of virtual hardware 1011 that represent portions of the actual physical disk or memory allocated to the virtual machine 101. Once an application is installed within the virtual machine 101, the guest operating system retrieves files from the virtual disks as if they were stored by a conventional application installation mechanism. Similarly, the cloned virtual machine 103 includes a guest operating system 1032, guest applications 1030 running on the guest operating system 1032, and virtual hardware 1031 which represents a hardware state of the cloned virtual machine 103.

The virtual computer environment further comprises a hypervisor or Virtual Machine Monitor 105 forming a layer of system software that runs under the guest operating systems of the virtual machines. In particular, the hypervisor 105 runs between the virtual machine 101 and the underlying hardware platform 106 which is responsible for actually executing virtual machine instructions and transferring data to and from the actual memory and storage devices. The hypervisor is provided to manage the virtual machines. Although only one hypervisor 105 is shown, the skilled person will readily understand that each virtual machine in the virtual environment may include its own hypervisor. The hypervisor 105 can be viewed as a piece of software that runs directly on top of the host platform and virtualizes the physical resources. In accordance with certain embodiments of the invention, the hypervisor 105 can be coupled to the cloning engine 102 that adaptively clones a parent virtual machine 101 into a cloned virtual machine 103 to a target location.

Alternatively, the cloning engine 102 may reside on the hypervisor layer 105, or the cloning engine 102 may reside on a virtual management center managing all the virtual machines that belong to a virtual computer system. Still further, the cloning engine 102 may reside on a separate location from that set out above.

The cloning engine 102 is configured to selectively clone a parent virtual machine 101 in response to cloning request(s) based on information captured from the environment where the cloned virtual machine is intended to be deployed.

In the present description, the terms "selective clone" or "selectively clone" or "adaptive clone" or "adaptively clone" are used to designate the process of cloning a selected set of virtual disks among the virtual disks of the virtual machine. The terms "adaptive cloning" or "adaptively clone" are used herein to designate more specifically, the process of cloning a selected content part of a selected set of virtual disks. The terms "partial clone" or "partially clone" may also be used to designate selective or adaptive cloning processes.

The cloning requests may be received from a virtual management center managing the virtual machines belonging to the computer system. Alternatively, cloning requests may be received by using local or remote predefined commands specific to the virtualization technology such as VMware VIX API for VMware technology (VMware is a registered trademark or trademark of VMware, Inc. in the United States and/or other jurisdictions), or by using predefined Application Programming Interfaces (APIs), depending on the virtualization technology. An exemplary virtualization technology is the VMware Virtual Infrastructure (VI) Software Development Kit (SDK) for VMware.

To selectively clone the parent virtual machine 101, the virtual machine cloning engine 102 identifies the resources needed to clone the parent virtual machine 101, identifies the target operating environment of the parent virtual machine 101, and identifies the state of the parent virtual machine 101. The cloning engine 102 further determines the constraints related to the target environment where the clone 103 is to be deployed and then calculates the best suitable clone from the information related to the parent virtual machine 101, the target environment, and possibly predefined conditions related to software applications.

To generate the clone virtual machine 103, the cloning engine 102 selects the virtual disks to be cloned among the virtual disks of the parent virtual machine 101 based on information related to the parent virtual machine 101, the target environment, and possibly additional user inputs, such as the specification of a subset of software products to be cloned. The information related to the parent virtual machine may be retrieved from at least one configuration file that depends on the virtualization technology. For example, the VMware vmx configuration file may be used for VMware technology.

In addition to this information, the configuration file may include custom tags that can be used for application specific purposes, for example to indicate the software application installed in a specific virtual disk.

The cloning engine 102 may also change the content of the virtual disks using Application Program Interfaces to match the calculated clone, e.g., perform adaptive partial cloning.

The cloning engine 102 may use predefined cloning rules maintained in a cloning constraint repository. The predefined cloning rules define cloning conditions for determining the type of cloning that should be applied to the virtual machines in the virtual computer environment. The cloning rules may be predefined as configuration parameters or received as user inputs. Cloning rules may include rules defining how virtual machines can be cloned. For example, virtual machines may be cloned as a full clone, selective partial clone involving selecting virtual disks, adaptive partial clone involving modification(s) of the virtual disk content, etc.

Cloning rules may also include rules defining conditions for cloning a virtual machine on a host, such as a full clone, selective partial clone, adaptive partial clone, etc., based on some host parameters. Such cloning rules may include for example, performing a full clone if the host is "host1.domain.com", performing a selective partial clone if the central processing unit (CPU) resources allocated or available to the host are less than a specific threshold or performing an adaptive partial clone if a given software product is already installed on the host, e.g., in one of its virtual machines.

Cloning rules may also include rules defining how an already existing virtual machine can be changed in terms of resource allocation, for example, in terms of central processing unit (CPU) resources, Memory and Network Bandwidth, if an associated virtual machine is involved in partial cloning (e.g., a selective partial clone or an adaptive partial clone) while the virtual machine contains software applications that are also part of the parent virtual machine and that accordingly should not be cloned.

The cloning constraints may further define conditions related to guest software applications running in the virtual machines and parameters that can be used to select virtual disks for partial cloning (selective cloning and adaptive cloning).

The cloned virtual machine 103 thereby includes virtual hardware 1031 that has a mapping to hardware resources equivalent to a portion of those of the parent virtual machine 101, an operating system 1032 that is equivalent to the state of the parent operating system 1012, and applications 1030 corresponding to a portion of the parent application stack 1010. The virtual disks 130 of the clone 103 are generated from a number of virtual disks among the virtual disks 110 of the parent virtual machine, with possible changes as regards their content depending on the clone calculated by the cloning engine 102.

Figure 2:
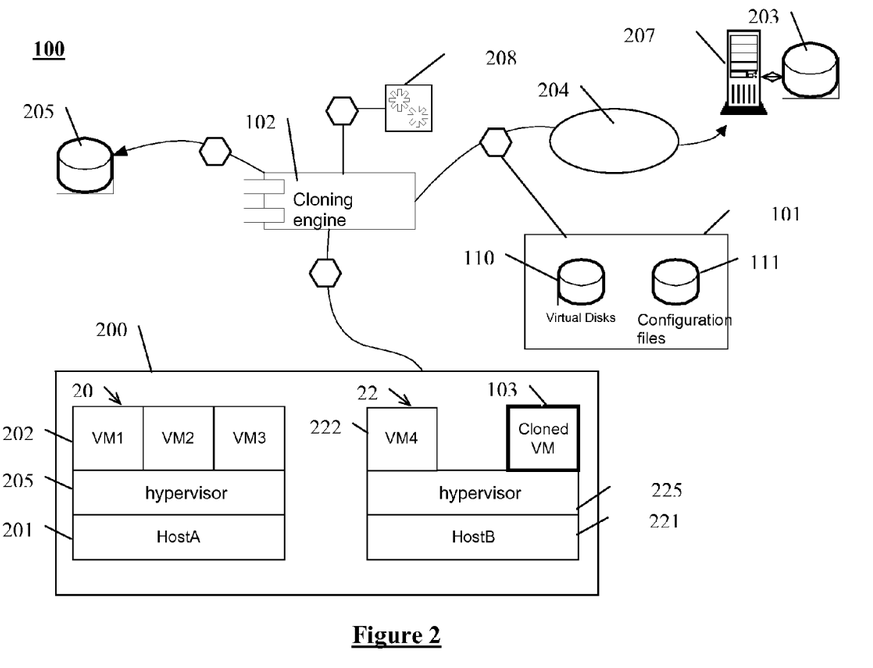
FIG. 2 shows an exemplary implementation of the cloning system, according to certain embodiments of the invention.

FIG. 2 is a block diagram showing an exemplary implementation of the system 100 for adaptively cloning virtual machines in accordance with certain embodiments of the invention.

FIG. 2 shows a target virtual computer environment 200. For example, the target virtual computer environment may comprise an environment where the cloned virtual machine 103 is intended to be deployed, such as a virtual data center. The target virtual computer environment 200 includes two host platforms 20 and 22. Each host platform 20, 22 comprises a host 201 and 221 respectively, a hypervisor 205 and 225 and a set of virtual machines 202 and 222. In the example represented in FIG. 2, the host 201 includes three virtual machines VM1, VM2 and VM3 and the host 221 initially includes one virtual machine VM4.

The cloning engine 102 is adapted to clone a selected virtual machine 101 from a source virtual environment into a cloned virtual machine 103 to a target location 22 in the target virtual environment 200, based on information captured from the environment where the cloned virtual machine 103 is intended to be deployed, and based upon user inputs. The cloning engine 102 is coupled to the hypervisor 105 (not shown) of the parent virtual machine to generate a partial clone of the parent virtual machine.

The cloning system further includes a virtual machine repository 205 comprising information about the virtual machines that are to be cloned, including information about the guest application stack 1040 available in each virtual machine that is to be cloned and information about the location of the applications installed in each parent virtual machine, such as the virtual disk location. The repository 205 may obtain this information from the configuration file 111 stored in the parent virtual machine 101.

The system 100 also includes a cloning information collector 203 that contains information about the hosts and the virtual machines already deployed and available in the virtual environment 200. The cloning information collector 203 also contains information about the guest application stack available in these virtual machines. The cloning information collector 203 may be managed by a server 207 through communication means 204 such as any known public or proprietary local or wide-area network like the Internet. The cloning information collector 203 may also store this information in data structures, such as tables in a database.

The cloning engine 102 is coupled to the cloning information collector 203 and to the virtual machine repository 205 to adaptively clone the selected parent virtual machine 101 based on information related to the parent virtual machine, user inputs and information related to the target environment. For a given parent virtual machine that is to be cloned, the target environment refers to the environment on which the clone generated from the parent virtual machine is to run.

The cloning engine 102 may further use a standalone application 208 that interacts with the hypervisor 105 to calculate the best clone of the virtual machine that satisfies the target environment constraints and the user requirements. The standalone application 208 may be a plug-in added to the virtual center management system or a separate standalone application.

The cloning engine 102 may also adapt the virtual machines already deployed in the virtual computer environment in order to meet a given configuration and a target performance described in the virtual appliance descriptors, based on the partial cloning results. Such an adaptation of a virtual machine impacts the resources allocated to the virtual machine and, if needed, also the configuration of the software applications installed in the virtual machine. For example, if during the adaptive partial cloning of a parent virtual machine in accordance with embodiments of the invention, a software product from the parent virtual machine is not cloned, e.g., because it is already available in another virtual machine, the cloning engine may automatically increase the central processing unit or memory of that virtual machine to support more users.

Figure 3:
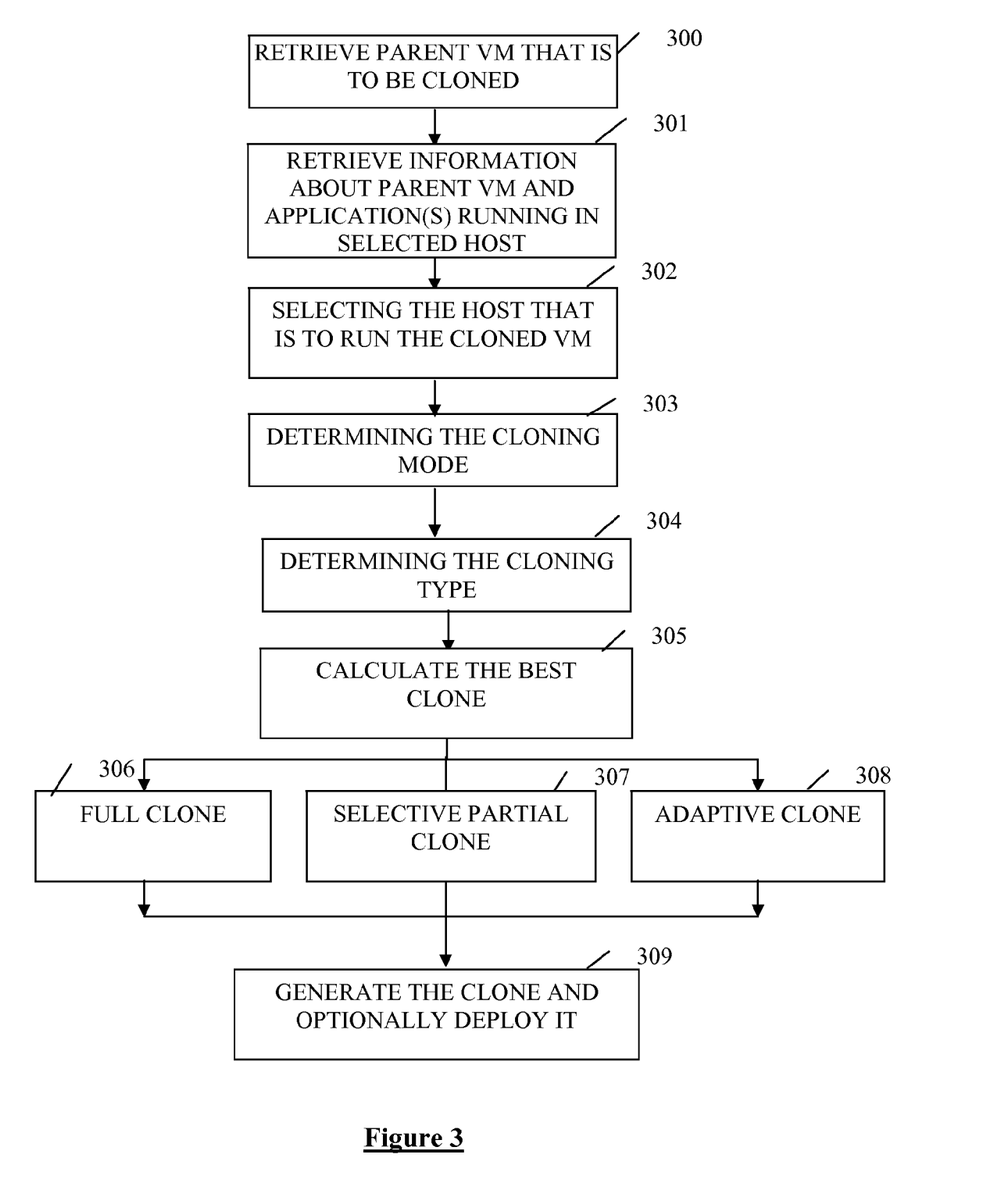
FIG. 3 shows a flowchart for cloning a virtual machine in accordance with the embodiments of the invention.

FIG. 3 shows a flowchart for cloning a given virtual machine in accordance with embodiments of the invention.

At 300, a parent virtual machine is selected as a template for adaptive cloning. The parent virtual machine may be retrieved from an external repository. The parent virtual machine is composed of virtual disk files and virtual machine configuration files.

At 301, the cloning engine 102 retrieves from repository 205, the list of software applications (or software products) installed in the parent virtual machine. The cloning engine 102 also retrieves the relation between the software applications and the virtual machine virtual disks. The list may have the following format:

$$VM[VD1[PRD1,\ldots,PRDk],\ldots,VDn[PRDk+1,\ldots,PRDj]]$$

where VM identifies the Virtual Machine, VDi ($1<=i<=n$) identifies each virtual disk allocated to the virtual machine and [PRD1, ... PRDj] represent information related to each software product [PRD1, ..., PRDj] installed in each virtual disk VDi. The information related to each software product PRDi ($1<=i<=j$) may include version and release information and product directories.

Retrieval at 301 may include retrieving this information from a configuration file provided with the virtual machine such as an Open Virtualization Format (OVF) if the virtual machine is provided in the OVF format. Such configuration file may contain the list of the software applications installed in the virtual machine, the virtual disks that belong to the virtual machine and their relationships. Alternatively, retrieval at 301 may be performed by using predefined Application Programming Interface(s) for introspecting virtual file systems offline depending on the virtualization technology. Such application programming interfaces use discovery mechanisms to discover software applications installed in the virtual machine. According to yet another embodiment of the invention, retrieval at 301 may be performed by retrieving information from the virtual machine configuration file(s).

At 302, the target host operating system where the clone virtual machine is to run is selected.

Cloning a virtual machine may further include determining a cloning mode at 303, e.g., by retrieving the clone operation mode as selected by the user or defined as a configuration parameter. The clone operation mode may include, for example, a user assisted clone operation mode involving user interactions during the cloning process or an automatic clone operation mode involving no user interaction. If the automatic clone operation mode is selected, no user action will be required during the cloning steps. The following description will be made with reference to an automatic clone operation mode for illustrative purpose only.

Predefined rules are selected at 304 from the cloning constraint repository that are to be applied to the selected parent virtual machine. These rules are used to determine what type of cloning should be applied to the parent virtual machine (such as full cloning, selective partial cloning or adaptive partial cloning).

Information about the target host operating system, its virtual machines, and the guest application stacks available in its virtual machines are retrieved at 305 from the cloning information collector 203. The information stored in the cloning information collector 203 comprises information about the hosts, the virtual machines belonging to the host and the software applications installed in the virtual machines. The information retrieved at 305 may be represented by the following exemplary notations:

$$Hs[VM1[PRD1,\ldots,PRDk],\ldots,VMn[PRDk+1,\ldots,PRDj]]$$

where Hs identifies the host, VMi ($1<=i<=n$) identifies the virtual machine and PRD1 ... PRDj represent the information related to the software products installed in the virtual machine.

The cloning information collector 203 may, for example, include the following tables:

A virtual machine table for the Virtual Machines (VM) in the target computer environment:

| VM identifier | VM |
|---|---|
| 1 | VM1 |
| 2 | VM2 |
| 3 | VM3 |
| 4 | VM4 |

A host table for the hosts provided in the target computer environment:

| Host identifier | HOST |
|---|---|
| 1 | HOSTA |
| 2 | HOSTB |

A product table comprising information related to the software products installed in the target computer environment:

| Product Identifier | Product | Directory |
|---|---|---|
| 1 | Prod1 | /prod1 |
| 2 | Prod2 | /prod2 |
| 3 | Prod3 | /prod3, /prod3a |
| 4 | Prod4 | /prod4 |
| 5 | Prod5 | /prod5 |

A first relation table indicating the relationships between the hosts and the virtual machines:

| Host identifier | VM identifier |
|---|---|
| 1 | 1 |
| 1 | 2 |
| 1 | 3 |
| 2 | 4 |

A second relation table indicating the relationship between the virtual machines and the products:

| VM identifier | Product identifier |
|---|---|
| 1 | 1 |
| 1 | 2 |
| 2 | 3 |
| 3 | 4 |
| 4 | 5 |

The skilled person will readily understand that the above exemplary tables are simplified examples to facilitate the understanding of the invention and that more complex tables with additional data may be maintained in the cloning information collector 203.

At 306 to 308, the clone of the parent virtual machine is calculated, e.g., based on information retrieved about the parent virtual machine at 301, on information retrieved about the target host operating system at 305 and on the cloning operation type identified at 304.

At 307 and 308, the cloning engine introspects the virtual disks of the parent virtual machine to determine a subset of the virtual disks among the virtual disks of the parent virtual machine based on the target environment information and based on parent virtual machine information (selective partial cloning and adaptive partial cloning). In adaptive partial cloning mode at 308, the cloning engine further changes the content of the selected virtual disks among the subset of the virtual disks. A modified clone template is created from the selected virtual disk content.

More specifically, if the clone operation type is "full clone", a full clone of the parent virtual machine is performed to the selected host at 306.

If the clone operation type is "selective partial clone", the virtual disks of the parent virtual machine that are to be cloned (target virtual disks) are determined at 307.

The target virtual disks are determined from the parent virtual machine information retrieved at 301 and the host related information retrieved in step 305.

If the clone operation type is "adaptive partial clone", a set of virtual disks of the parent virtual machine is determined at 308 that are to be partially cloned in terms of disk content on the host. This set of virtual disks that are to be cloned is determined from the parent virtual machine information retrieved at 301 and the host related information retrieved at 305.

For each target virtual disk, instead of copying the whole virtual disk, only selected disk portions identified from the information related to the software products PRDi are selected for cloning. This can be performed by using predefined Application Programming Interface(s) for accessing an existing virtual disk (even if the virtual machine is not active), and reading/copying its content in a new virtual disk. The predefined application programming interfaces depend on the virtualization technology. For example, VMware VDDK API may be used for VMware technology.

At 307 and 308, the virtual disks that are to be cloned may be determined based on conditions related to the software applications information.

At 310, the virtual machine clone is then generated based on the clone template calculated at 306 to 308. To generate the clone, the cloning engine may first initiate preparation for cloning. To prepare for cloning, the cloning engine 102 may notify the selected parent virtual machine to prepare for cloning. For example, the cloning engine 102 may access an application program interface at the parent virtual machine and notify the selected template virtual machine to prepare for cloning. The clone preparation phase may also initiate a deactivation of the parent virtual machine so that it does not accept any additional requests for cloning. Once the parent virtual machine notifies that the selective cloning can take place, the cloning engine 102 can initiate the selective cloning of the parent virtual machine. To start the partial cloning of the virtual machine, the cloning engine may instruct the hypervisor 105 of the parent virtual machine to migrate (or copy) a part of running virtual machine corresponding to the modified template to another virtual machine at the target hypervisor. The cloning engine may also generate a message to enable use of the cloned virtual machine in the target environment and notify the hypervisor 105 of the parent virtual machine to reactivate the selected parent virtual machine so that it can be used as a template for a new clone.

Figure 4:
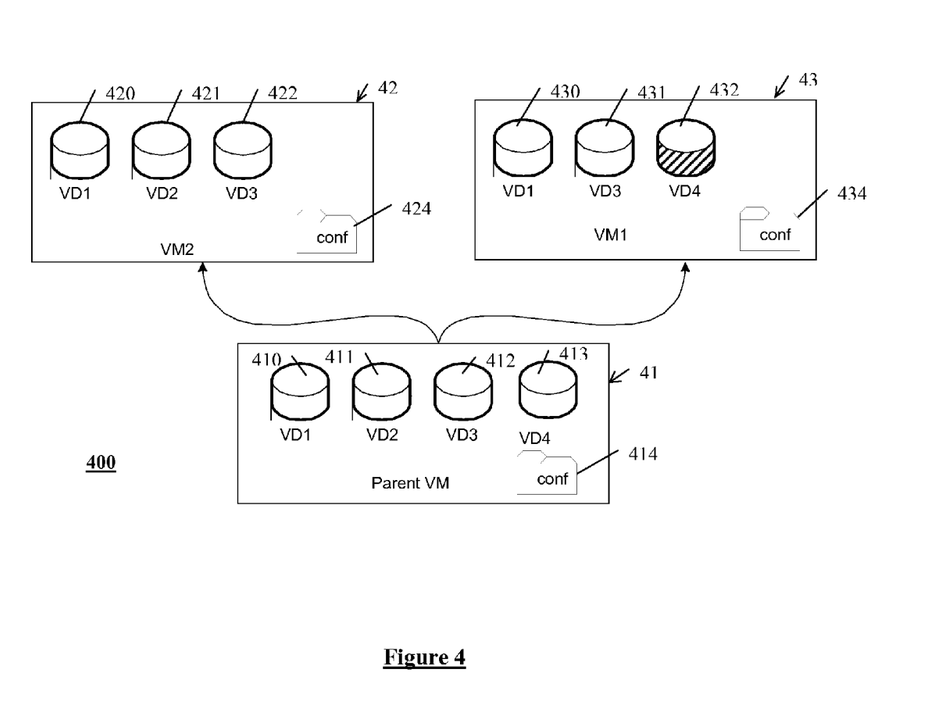
FIG. 4 shows an exemplary cloning configuration obtained with a cloning system in accordance with certain embodiments of the invention.

FIG. 4 shows a simplified view of an exemplary virtual architecture 400 comprising a parent virtual machine 41 and two clones 42 and 43 generated from the parent virtual machine 41 using a cloning method according to the embodiments of the invention set out in greater detail herein.

The parent virtual machine 41 includes four virtual disks 410, 411, 412 and 413 and at least one configuration file 414.

The clone 42 generated from the parent virtual machine 41 has been obtained in accordance with aspects of the invention, using the information stored in the configuration files and from the virtual disks of the parent virtual disks. Only the first three virtual disks 410, 411 and 412 have been copied to the clone 42 (referred to respectively as 420, 421 and 422 in clone 42) as a result of the constraints related to the target environment and the constraints defined by the user. The content of the virtual disks 410, 411 and 412 has not been changed except for customization purpose. The configuration file 414 of the parent virtual machine 41 has been copied into clone 42 (referred to as 424 in clone 42).

The clone 43 generated from the parent virtual machine 41 has also been obtained in accordance with a cloning method in accordance with aspects of the invention as set out in greater detail herein. The first two virtual disks 410 and 411 of the parent virtual machine 41 have been copied to clone 43 without any change to their content except for customization purpose (referred to respectively as 430 and 431 in clone 43), while the last virtual disk 413 of the parent virtual machine has been cloned with changes to its contents (referred to respectively as 432 in clone 43) as a result of the constraints related to the target environment on which clone 43 runs and the constraints defined by the user. The configuration file 414 of the parent virtual machine 41 has been copied into clone 43 (referred to respectively as 434 in clone 43).

Instead of cloning the whole parent virtual machine 41, it is thus possible to generate partial clones of the parent virtual machine 41 that are adapted to the target environment of the clone and the user constraints, by introspecting and changing virtual disks offline (by deactivating the parent virtual machine 41) and selecting the appropriate virtual disks to be allocated and configured.

Various aspects of the invention accordingly allow selective cloning of a virtual machine based on information captured from the target environment where the cloned virtual machine is to be deployed. Selective cloning of a virtual machine may also and/or alternatively be based upon other user constraints. Reconfiguration of a cloned virtual machine that are already deployed may also be implemented.

Instead of copying the whole virtual machine that serves as a template, the invention performs virtual disk introspection using a specific application programming interface to provide an adapted clone.

Aspects of the present invention described more fully herein are suitable for operation in Virtual to Virtual (V2V) scenarios and in Physical to Virtual (P2V) scenarios. In P2V scenarios, the physical disk can be cloned not just as a raw copy of the disk, but by creating virtual disk partitions where the software products will be saved in a configurable way. For example, aspects of the invention can provide a primary partition with operating system and basic applications and a secondary partition with all the optional applications.

Aspects of the invention optimize energy consumption and foster disk resource savings by reusing existing resources while avoiding systematic duplication of the whole parent virtual machine. For instance, cloning methods set out in greater detail herein, diminish the amount of disk space to be copied/moved thereby resulting in network traffic reduction. Comparatively, traditional full cloning methods increment network traffic.

Further, aspects of the invention allow selective cloning of a virtual machine based on user inputs and on the target environment on which the clone is to run. A particular sequencing of Application Programming Interfaces (API) and commands can be used to implement such partial cloning of virtual machines. Methods for adaptively cloning a virtual machine in accordance with the embodiments of the invention allow selection of components that are to be cloned, thereby optimizing resource allocation.

Aspects of the invention optimize virtual machine image repositories in a way that makes virtual machine image sprawl manageable.

Figure 5:
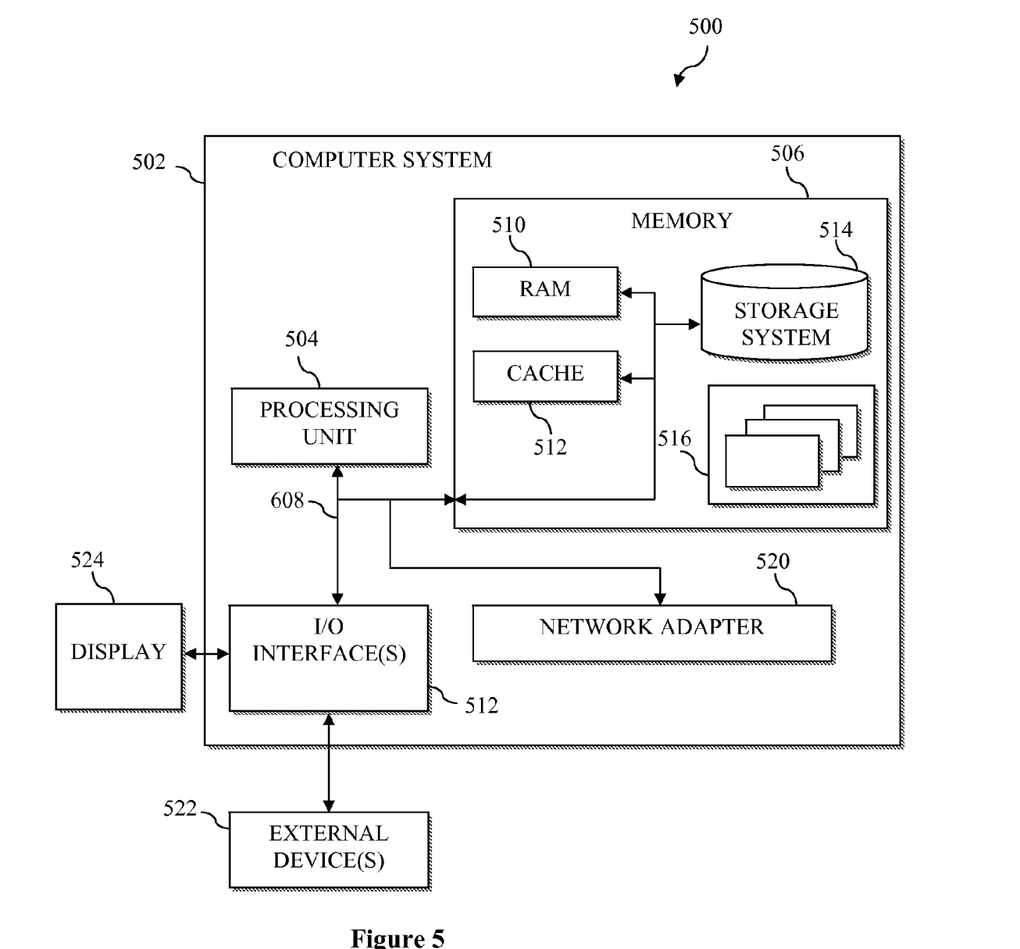
FIG. 5 shows a block diagram of a computer system having a computer readable storage medium, the computer system suitable for storing and/or executing computer code that implements various aspects of the present invention as described in greater detail herein.

Referring to FIG. 5, a block diagram of a data processing system 500 implemented as a computer system 502 is depicted in accordance with aspects of the present invention. The computer system 502 is operational with numerous general purpose or special purpose computing system environments or configurations. Moreover, the computer system 502 may be described in the general context of computer system executable instructions, such as program modules, being executed by a computer system. Generally, program modules may include routines, programs, objects, components, logic, data structures, and so on that perform particular tasks or implement particular abstract data types.

The components of the computer system 502 may include, but are not limited to, one or more processors or processing units 504, such as a symmetric multiprocessor (SMP) system or other configuration including a plurality of processors connected to the system bus. Alternatively, a single processor may be employed. Components of the computer system 502 further include a system memory 506, and a bus 508 that couples various system components including system memory 506 to the processor(s) 504. The memory 506 can include computer system readable media in the form of volatile memory, such as random access memory (RAM) 510 and/or cache memory 512. The memory 506 may also include other removable/non-removable, volatile/non-volatile computer system storage media, such as a storage system 514, e.g., one or more hard drives. Memory 506 may also include at least one computer readable storage medium 516 having computer readable program code embodied therewith, the computer readable program code configured to carry out the functions of embodiments described more fully herein, including cloning of virtual machines in a virtual computer environment described with reference to FIGS. 1-4. Still further, cloning of a virtual machine may be implemented, for example, by at least one processor 504 that executes code stored in memory 506.

The computer system 502 may also comprise input/output (I/O) interface(s) 518 and/or a network adapter 520 that communicate with the processor 504 across the bus 508. The computer system 502 may also interface with external devices 522 and/or a display 524. Other hardware and/or software components could be used in conjunction with computer system 502.

The data processing system may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

Aspects of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, aspects of the invention can take the form of a computer program product accessible from a computer-usable or computer-readable medium providing program code for use by or in connection with a computer or any instruction execution system.

For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for cloning a virtual machine belonging to a virtual computer environment, the method comprising:
    retrieving application information about applications available in a parent virtual machine to be cloned;
    retrieving virtual-disk information about a plurality of virtual disks of the parent virtual machine containing the available applications;
    identifying a target environment on which a clone is to run;
    retrieving target information about the target environment;
    selecting a subset of the available applications as applications to be included in the clone, wherein the selecting is based on the application information, the virtual-disk information, and the target information;
    identifying a subset of virtual disks among the plurality of virtual disks and a portion of at least one of the subset of virtual disks including the selected subset of available applications;
    calculating the clone by selecting the identified portion of the at least one of the subset of virtual disks, wherein the clone includes the selected portion of the at least one of the subset of virtual disks and excluding other portions of the subset of virtual disks; and
    generating, based on the calculating, the clone to the target environment.

2. The method of claim 1, wherein identifying the subset of virtual disks of the plurality of virtual disks and the portion of at least one of the subset of virtual disks further comprises using predefined application programming interfaces for accessing the plurality of virtual disks.

3. The method of claim 1, wherein the target information comprises:
    host information about a host included in the target environment, virtual-machine information about virtual machines belonging to the host, and software-application information about software applications installed in the virtual machines.

4. The method of claim 3, wherein the virtual-machine information is retrieved from at least a configuration file provided with the virtual machines belonging to the host.

5. The method of claim 4, wherein the configuration file is an Open Virtualization Format file.

6. The method of claim 3, wherein the virtual-machine information is retrieved by predefined application programming interfaces for introspecting virtual file systems.

7. The method of claim 3, wherein the virtual-machine information is retrieved from virtual machine descriptors.

8. The method of claim 1, further comprising previously determining a cloning mode.

9. A computer-readable memory storing a program for cloning a virtual machine belonging to a virtual computer environment, wherein the program instructs a processor to perform:
    retrieving application information about applications available in a parent virtual machine to be cloned;
    retrieving virtual-disk information about a virtual disk of the parent virtual machine containing the available applications;
    identifying a target environment on which a clone is to run;
    retrieving target information about the target environment, wherein the target information includes host information about a host included in the target environment, virtual-machine information about virtual machines belonging to the host, and software-application information about software applications installed in the virtual machines, and wherein the virtual-machine information is retrieved from at least a configuration file provided with the virtual machines belonging to the host;

selecting a subset of the available applications as applications to be included in the clone, wherein the selecting is based on the application information, the virtual-disk information, and the target information;

identifying portions of the virtual disk including the selected subset of the available applications;

calculating the clone by selecting the identified portions of the virtual disk, wherein the clone includes the selected portions of the virtual disk and excluding other portions of the virtual disk; and generating, based on the calculating, the clone to the target environment.

10. The computer-readable memory of claim 9, wherein:

retrieving virtual-disk information includes retrieving virtual-disk information about a plurality of virtual disks of the parent virtual machine; and identifying portions of the virtual disk further includes identifying a subset of virtual disks of the plurality of virtual disks and a portion of at least one of the subset of virtual disks including the selected subset of applications.

11. The computer-readable memory of claim 9, wherein identifying portions of the virtual disk further comprises using predefined application programming interfaces for accessing the virtual disk.

12. The computer-readable memory of claim 9, wherein the configuration file is an Open Virtualization Format file.

13. The computer-readable memory of claim 9, wherein the virtual-machine information is retrieved by predefined application programming interfaces for introspecting virtual file systems.

14. The computer-readable memory of claim 9, wherein the virtual-machine information is retrieved from virtual machine descriptors.

15. The computer-readable memory of claim 9, wherein the program further instructs the processor to perform determining a cloning mode.

16. A method for cloning a virtual machine belonging to a virtual computer environment, the method comprising:

retrieving application information about applications available in a parent virtual machine to be cloned;

retrieving virtual-disk information about a virtual disk of the parent virtual machine containing the available applications;

identifying a target environment on which a clone is to run;

retrieving target information about the target environment, wherein the target information includes host information about a host included in the target environment, virtual-machine information about virtual machines belonging to the host, and software-application information about software applications installed in the virtual machines, and wherein the virtual-machine information is retrieved by predefined application programming interfaces for introspecting virtual file systems;

selecting a subset of the available applications as applications to be included in the clone, wherein the selecting is based on the application information, the virtual-disk information, and the target information;

identifying portions of the virtual disk including the selected subset of the available applications;

calculating the clone by selecting the identified portions of the virtual disk, wherein the clone includes the selected portions of the virtual disk and excluding other portions of the virtual disk; and generating, based on the calculating, the clone to the target environment.

* * * * *